(12) United States Patent
Appuswamy et al.

(10) Patent No.: US 10,115,054 B2
(45) Date of Patent: Oct. 30, 2018

(54) CLASSIFYING FEATURES USING A NEUROSYNAPTIC SYSTEM

(71) Applicant: INTERNATIONAL BUSINESS MACHINES CORPORATION, Armonk, NY (US)

(72) Inventors: Rathinakumar Appuswamy, San Jose, CA (US); Steven K. Esser, San Jose, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 14/322,778

(22) Filed: Jul. 2, 2014

(65) Prior Publication Data

US 2016/0004962 A1 Jan. 7, 2016

(51) Int. Cl.
*G06N 3/063* (2006.01)
*G06N 3/04* (2006.01)

(52) U.S. Cl.
CPC ............. *G06N 3/063* (2013.01); *G06N 3/049* (2013.01)

(58) Field of Classification Search
CPC .. G06N 3/02; G06N 3/04; G06N 3/06; G06N 3/063
See application file for complete search history.

(56) References Cited

U.S. PATENT DOCUMENTS

| | | | |
|---|---|---|---|
| 4,874,963 A | 10/1989 | Alspector | |
| 5,634,087 A | 5/1997 | Mammone et al. | |
| 6,018,740 A | 1/2000 | Ito | |

(Continued)

FOREIGN PATENT DOCUMENTS

| | | |
|---|---|---|
| CN | 102088597 A | 6/2011 |
| CN | 102864499 A | 1/2013 |

OTHER PUBLICATIONS

Emre Neftci, Jonathan Binas, Ueli Rutishauser, Elisabetta Chicca, Giacomo Indiveria, and Rodney J. Douglas, "Synthesizing cognition in neuromorphic electronic systems", Proceedings of the National Academy of Sciences of the United States of America, vol. 110 No. 37 , Jun. 10, 2013, pp. E3468-E3476.*

Nojun Kwak and Chong-Ho Choi, "Input Feature Selection for Classification Problems", IEEE Transactions on Neural Networks, vol. 13, No. 1, Jan. 2002, pp. 143-159.*

(Continued)

*Primary Examiner* — Eric Nilsson
(74) *Attorney, Agent, or Firm* — Sherman IP LLP; Kenneth L. Sherman; Hemavathy Perumal

(57) ABSTRACT

Embodiments of the invention provide a method comprising receiving a set of features extracted from input data, training a linear classifier based on the set of features extracted, and generating a first matrix using the linear classifier. The first matrix includes multiple dimensions. Each dimension includes multiple elements. Elements of a first dimension correspond to the set of features extracted. Elements of a second dimension correspond to a set of classification labels. The elements of the second dimension are arranged based on one or more synaptic weight arrangements. Each synaptic weight arrangement represents effective synaptic strengths for a classification label of the set of classification labels. The neurosynaptic core circuit is programmed with synaptic connectivity information based on the synaptic weight arrangements. The core circuit is configured to classify one or more objects of interest in the input data.

17 Claims, 12 Drawing Sheets

(56) References Cited

U.S. PATENT DOCUMENTS

| | | | |
|---|---|---|---|
| 6,670,963 B2* | 12/2003 | Osberger | G06K 9/00711 345/582 |
| 6,757,666 B1 | 6/2004 | Thomas | |
| 7,398,259 B2 | 7/2008 | Nugent | |
| 7,636,098 B2 | 12/2009 | Yang et al. | |
| 7,707,128 B2 | 4/2010 | Matsugu | |
| 7,958,071 B2 | 6/2011 | Snider et al. | |
| 8,098,886 B2 | 1/2012 | Koch et al. | |
| 8,311,965 B2 | 11/2012 | Breitwisch et al. | |
| 8,332,340 B2 | 12/2012 | Snider | |
| 8,369,652 B1 | 2/2013 | Khosla et al. | |
| 8,385,654 B2 | 2/2013 | Gu et al. | |
| 8,401,297 B1 | 3/2013 | Apostolos et al. | |
| 8,538,074 B2 | 9/2013 | Nakamura et al. | |
| 8,600,919 B2 | 12/2013 | Poon et al. | |
| 8,626,686 B1 | 1/2014 | Rhodes | |
| 8,699,767 B1 | 4/2014 | Khosla et al. | |
| 8,731,302 B2 | 5/2014 | Eshima | |
| 8,774,498 B2* | 7/2014 | de Campos | G06K 9/00597 382/115 |
| 8,907,971 B2 | 12/2014 | Ballestad et al. | |
| 8,972,315 B2 | 3/2015 | Szatmary | |
| 8,977,582 B2 | 3/2015 | Richert | |
| 8,990,130 B2 | 3/2015 | Alvarez-Icaza Rivera | |
| 9,014,467 B2 | 4/2015 | Hu et al. | |
| 9,042,659 B2 | 5/2015 | Adamek et al. | |
| 9,070,039 B2 | 6/2015 | Richert | |
| 9,098,811 B2 | 8/2015 | Petre et al. | |
| 9,104,974 B2 | 8/2015 | Sim et al. | |
| 9,117,176 B2 | 8/2015 | Szatmary et al. | |
| 9,123,127 B2 | 9/2015 | Richert | |
| 9,159,020 B2 | 10/2015 | Alcarez-Icaza Rivera | |
| 9,218,563 B2 | 12/2015 | Szatmary | |
| 9,239,985 B2 | 1/2016 | Piekniewski et al. | |
| 9,262,712 B2 | 2/2016 | Modha | |
| 9,367,798 B2 | 6/2016 | Coenen et al. | |
| 9,418,333 B2 | 8/2016 | Kim et al. | |
| 2002/0154833 A1* | 10/2002 | Koch | G06K 9/4628 382/325 |
| 2005/0190966 A1 | 9/2005 | Etienne-Cummings et al. | |
| 2006/0182339 A1 | 8/2006 | Connell | |
| 2008/0089591 A1 | 4/2008 | Zhou | |
| 2008/0201282 A1 | 8/2008 | Garcia et al. | |
| 2010/0172584 A1 | 7/2010 | Lukac et al. | |
| 2010/0241601 A1 | 9/2010 | Carson et al. | |
| 2010/0312730 A1 | 12/2010 | Weng et al. | |
| 2011/0004579 A1 | 1/2011 | Snider | |
| 2012/0011089 A1 | 1/2012 | Aparin | |
| 2012/0109863 A1 | 5/2012 | Esser | |
| 2012/0109864 A1 | 5/2012 | Modha | |
| 2012/0109866 A1 | 5/2012 | Modha | |
| 2012/0173471 A1 | 7/2012 | Ananthanarayanan et al. | |
| 2012/0192048 A1 | 7/2012 | Suzuki et al. | |
| 2012/0259804 A1 | 10/2012 | Brezzo | |
| 2012/0308076 A1 | 12/2012 | Piekniewski et al. | |
| 2013/0018832 A1 | 1/2013 | Ramanathan et al. | |
| 2013/0073493 A1 | 3/2013 | Modha | |
| 2013/0073496 A1* | 3/2013 | Szatmary | G06N 3/10 706/25 |
| 2013/0131985 A1 | 5/2013 | Weiland et al. | |
| 2013/0311412 A1* | 11/2013 | Lazar | H03M 1/82 706/16 |
| 2014/0143193 A1 | 5/2014 | Zheng et al. | |
| 2014/0330761 A1 | 11/2014 | Kim et al. | |
| 2015/0139537 A1 | 5/2015 | Milner et al. | |
| 2015/0242690 A1 | 8/2015 | Richert | |
| 2015/0269439 A1 | 9/2015 | Versace | |
| 2015/0278628 A1 | 10/2015 | Agrawal | |
| 2015/0278641 A1 | 10/2015 | Agrawal | |
| 2015/0324684 A1 | 11/2015 | Alvarez-Icaza Rivera | |
| 2015/0339589 A1 | 11/2015 | Fisher | |
| 2015/0379689 A1 | 12/2015 | Andreopoulos | |
| 2016/0321537 A1 | 11/2016 | Akopyan | |
| 2016/0335535 A1 | 11/2016 | Amir | |
| 2017/0243076 A1 | 8/2017 | Andreopoulos et al. | |

OTHER PUBLICATIONS

Peter Tino, Bill G. Horne, C. Lee Giles, "Fininte State Machines and Recurrent Neural Networks Automata and Dynamical Systems Approaches", Techncal Report: UMIACS-TR-95-1 and CS-TR-3396 published by Institute for Advanced Computer Studies, University of Maryland, College Park, MD, 1998, pp. 1-50.*

Ali Borji and Laurent Itti, "State-of-the-Art in Visual Attention Modeling", IEEE Transactions on Pattern Analysis and Machine Intelligence, vol. 35, No. 1, Jan. 2013, pp. 185-207.*

Timothee Masquelier, Larissa Albantakis and Gustavo Deco, "The Timing of Vision—How neural processing links to different temporal dynamics", Frontiers in psychology vol. 2, article 151, Jun. 2011, pp. 1-14.*

Meng Joo Er, Shiqian Wu, Juwei Lu, Hock Lye Toh, "Face Recognition With Radial Basis Function (RBF) Neural Networks", IEEE Transactions on Neural Networks, vol. 13, No. 3, May 2002, pp. 697-710.*

Junwei Han, Peicheng Zhou, Dingwen Zhang, Gong Cheng, Lei Guo, Zhenbao Liu, Shuhui Bu, Jun Wu, "Efficient, simultaneous detection of multi-class geospatial targets based on visual saliency modeling and discriminative learning of sparse coding", ISPRS Journal of Photogrammetry and Remote Sensing, vol. 89, Jan. 29, 2014, pp. 37-48.*

Indiveri, Giacomo, Adrian M. Whatley, and Jörg Kramer. "A reconfigurable neuromorphic VLSI multi-chip system applied to visual motion computation." Microelectronics for Neural, Fuzzy and Bio-Inspired Systems, 1999. MicroNeuro'99. Proceedings of the Seventh International Conference on. IEEE, 1999.*

Vogelstein, R. Jacob, et al. "A multichip neuromorphic system for spike-based visual information processing." Neural computation 19.9 (2007): 2281-2300.*

Sima, H. et al., "Color Image Segmentation Based on Regional Saliency", Proceedings of the 19th International Conference on Neural Information Processing (ICONIP 2012), Part V, Nov. 12-15, 2012, pp. 142-150, Springer Verlag, Germany.

Vogelstein, R.J. et al., "A Multichip Neuromorphic System for Spike-Based Visual Information Processing", Neural Computation, 2007, pp. 2281-2300, vol. 19, Massachusetts Institute of Technology, United States.

Yin, Z. et al., "Likelihood Map Fusion for Visual Object Tracking", Proceedings of the 2008 Winter Workshop on Application of Computer Vision, Mitsubishi Electric Research Laboratories, Mar. 2008, pp. 1-9, IEEE, United States.

Yan, W. et al., "Salient Region Detection Algorithm Based on Frequency and Spatial Domain Analysis", Computer Engineering, Sep. 5, 2012, pp. 166-170, Vo. 38, No. 17, China (English-language Abstract attached, p. 1).

Andreopoulos, A. et al., "Visual saliency on networks of neurosynaptic cores", Mar. 2015, pp. 1-16, vol. 59, No. 2-3, IBM, United States.

List of IBM Patents or Patent Applications Treated as Related.

List of IBM Patents or Applications Treated as Related.

List of IBM Patents or Applications Treated as Related; Appuswamy, R. et al., Filed Aug. 21, 2018, U.S. Appl. No. 16/107,766; Andreopoulos, A., et al., Filed May 30, 2018, U.S. Appl. No. 15/993,482.

* cited by examiner

025# CLASSIFYING FEATURES USING A NEUROSYNAPTIC SYSTEM

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in some embodiments, to classifying features using a neurosynaptic system.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). Specifically, under the STDP rule, the conductance of a synapse increases if its post-synaptic neuron fires after its pre-synaptic neuron fires, and the conductance of a synapse decreases if the order of the two firings is reversed.

BRIEF SUMMARY

One embodiment of the invention provides a method comprising receiving a set of features extracted from input data, training a linear classifier based on the set of features extracted, and generating a first matrix using the linear classifier. The first matrix includes multiple dimensions. Each dimension includes multiple elements. Elements of a first dimension correspond to the set of features extracted. Elements of a second dimension correspond to a set of classification labels. The elements of the second dimension are arranged based on one or more synaptic weight arrangements. Each synaptic weight arrangement represents effective synaptic strengths for a classification label of the set of classification labels. The neurosynaptic core circuit is programmed with synaptic connectivity information based on the synaptic weight arrangements. The core circuit is configured to classify one or more objects of interest in the input data Another embodiment of the invention provides a neurosynaptic system comprising one or more classification units for assigning one or more classification labels to one or more features extracted from input data. At least one classification unit comprises at least one neurosynaptic core circuit configured to classify one or more object of interests in the input data. The core circuit is programmed with synaptic connectivity information based on one or more synaptic weight arrangements.

These and other features, aspects, and advantages of the present invention will become understood with reference to the following description, appended claims, and accompanying figures.

DETAILED DESCRIPTION

Figure 1:
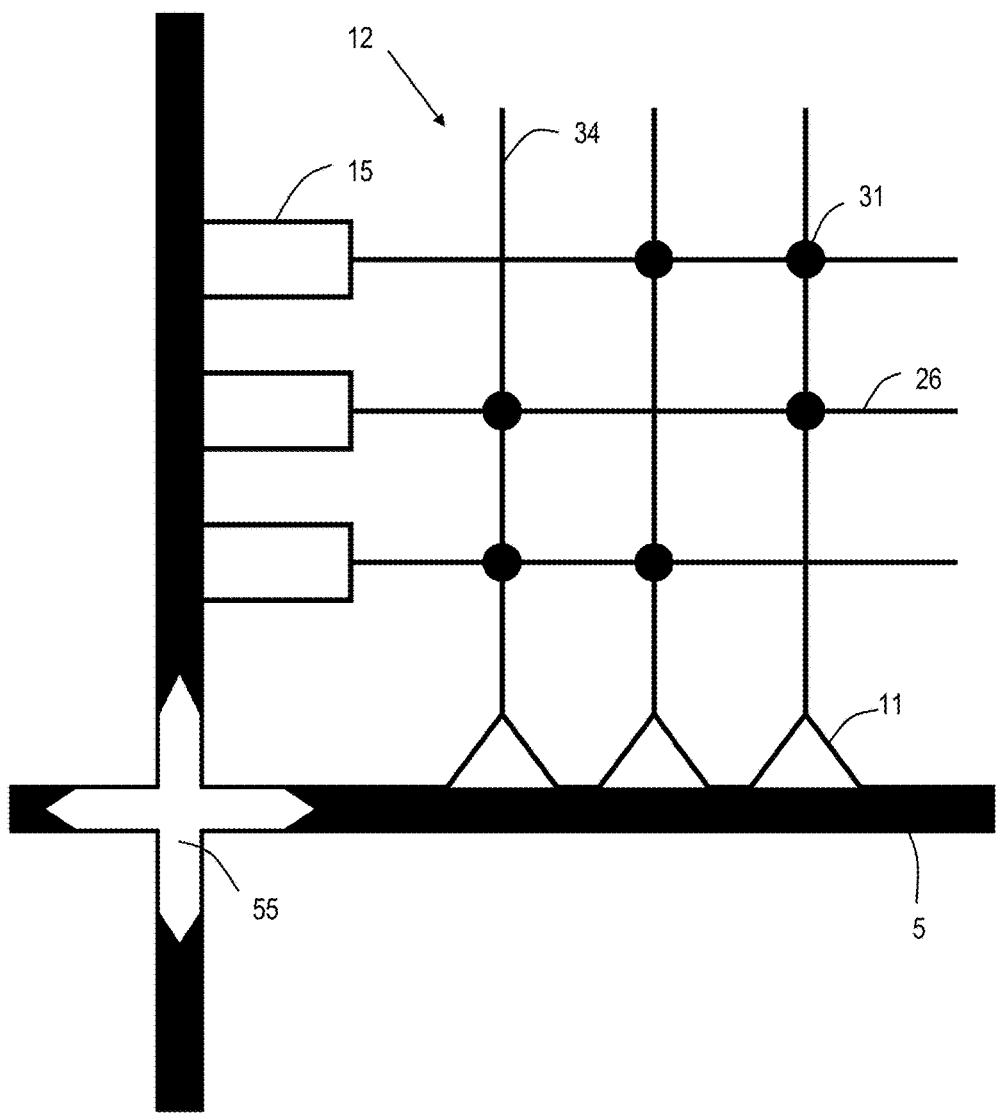
FIG. 1 illustrates an example neurosynaptic core circuit ("core circuit"), in accordance with an embodiment of the invention.

The present invention relates to neuromorphic and synaptronic computation, and in particular, classifying features using a neurosynaptic system. Embodiments of the invention are configured to receive a set of features extracted from input data, train a linear classifier based on the set of features extracted, and generate a first matrix using the linear classifier. The first matrix includes multiple dimensions. Each dimension includes multiple elements. Elements of a first dimension correspond to the set of features extracted. Elements of a second dimension correspond to a set of classification labels. The elements of the second dimension are arranged based on one or more synaptic weight arrangements. Each synaptic weight arrangement represents effective synaptic strengths for a classification label of the set of classification labels. The neurosynaptic core circuit is programmed with synaptic connectivity information based on the synaptic weight arrangements. The core circuit is configured to classify one or more objects of interest in the input data In one embodiment, a neurosynaptic system comprises a system that implements neuron models, synaptic models, neural algorithms, and/or synaptic algorithms. In one embodiment, a neurosynaptic system comprises software components and/or hardware components, such as digital hardware, analog hardware or a combination of analog and digital hardware (i.e., mixed-mode).

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

The term electronic axon as used herein represents an architecture configured to simulate a biological axon that transmits information from one biological neuron to different biological neurons. In one embodiment, an electronic axon comprises a circuit architecture. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

FIG. 1 illustrates an example neurosynaptic core circuit ("core circuit") 10, in accordance with an embodiment of the invention. The core circuit 10 comprises a plurality of electronic neurons 11 and a plurality of electronic incoming axons 15. The neurons 11 and the axons 15 are interconnected via an x×y synaptic crossbar 12, wherein x and y are integers greater than or equal to one. The crossbar 12 comprises multiple electronic synapse devices ("synapses") 31, multiple rows/axon paths 26, and multiple columns/dendrite paths 34.

Each synapse 31 communicates neuronal firing events (i.e., neural spikes) between an axon 15 and a neuron 11. Specifically, each synapse 31 is located at cross-point junction between an axon path 26 and a dendrite path 34, such that a connection between the axon path 26 and the dendrite path 34 is made through said synapse 31. Each axon 15 is connected to an axon path 26, such that said axon 15 sends firing events to the connected axon path 26. Each neuron 11 is connected to a dendrite path 34, such that said neuron 11 receives firing events from the connected dendrite path 34.

In one embodiment, each neuron 11 receives input (e.g., incoming neuronal firing events) via interconnected axons 15 and, in response to the input received, generates output (e.g., outgoing neuronal firing events) according to a neuronal activation function.

Each synapse 31 has a synaptic weight. The synaptic weights of the synapses 31 is represented by an x×y matrix W, wherein x and y are positive integers. A learning rule such as spike-timing dependent plasticity (STDP) may be applied to update the synaptic weights of the synapses 31.

In one embodiment, the synapses 31 are binary memory devices. For example, the synapses 31 are implemented using 1-bit static random-access memory (SRAM) cells. Each synapse 31 has a synaptic weight equal to "0" or "1". In one embodiment, a synapse 31 with a synaptic weight "0" indicates that the synapse 31 is non-conducting. In another embodiment, a synapse 31 with a synaptic weight "0" indicates that the synapse 31 is not connected. In one embodiment, a synapse 31 with a synaptic weight "1" indicates that the synapse 31 is conducting. In another embodiment, a synapse 31 with a synaptic weight "1" indicates that the synapse 31 is connected.

An external two-way communication environment may supply sensory inputs and consume motor outputs. The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using 1-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10.

As shown in FIG. 1, the core circuit 10 has a corresponding router 55. The router 55 is an up-down-left-right mesh router configured to receive incoming address-event router packets targeting axons 15 of the core circuit 10. In one embodiment, each incoming address-event packet includes an incoming neuronal firing event encoded as an address (e.g., an address represented as bits) representing a target axon 15 of the core circuit 10. The axons 15 of the core circuit 10 receive incoming address-event packet from the router 55 via one or more communication paths/channels 5 (e.g., a bus). The router 55 is also configured to send outgoing address-event router packets generated by neurons 11 of the core circuit 10. In one embodiment, each outgoing address-event packet includes an outgoing neuronal firing event encoded as an address (e.g., an address represented as bits) representing a target axon 15 of the same core circuit 10 or a different core circuit 10. The neurons 11 of the core circuit 10 send outgoing address-event packet to the router 55 via one or more communication paths/channels 5 (e.g., a bus).

In one example implementation, the core circuit 10 may comprise 256 neurons 11. The crossbar 12 may be a 256×256 ultra-dense crossbar array that has a pitch in the range of about 0.1 nm to 10 µm.

In one embodiment, soft-wiring in the core circuit 10 is implemented using address events (e.g., Address-Event Representation (AER)). Firing event arrival times included in address events may be deterministic or non-deterministic.

Although certain illustrative embodiments of the invention are described herein using synapses comprising electronic circuits, the present invention is not limited to electronic circuits.

Figure 2:
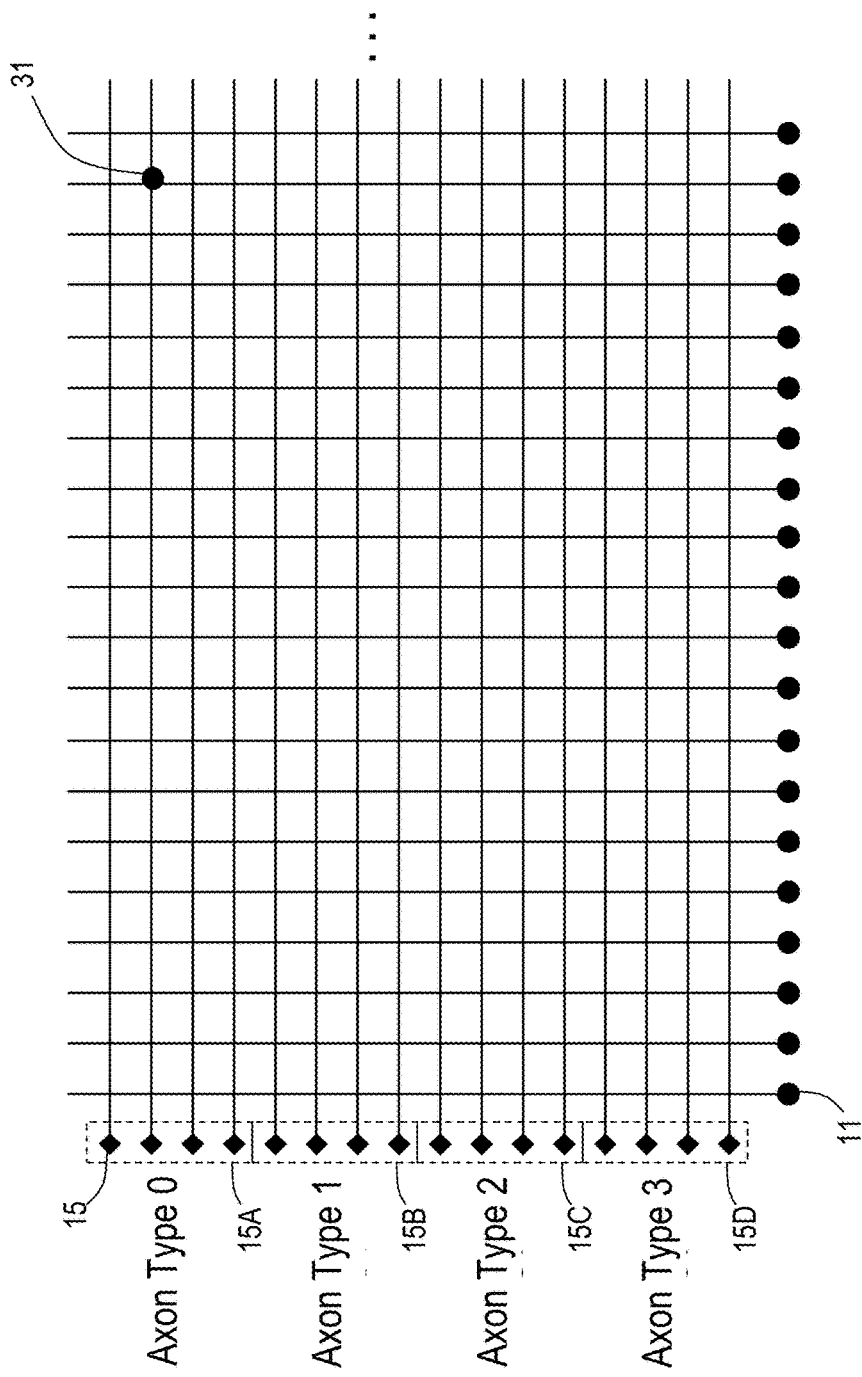
FIG. 2 illustrates a synaptic crossbar of a core circuit (FIG. 1), in accordance with an embodiment of the invention.

FIG. 2 illustrates a synaptic crossbar 12 of a core circuit 10 (FIG. 1), in accordance with an embodiment of the invention. The core circuit 10 receives input (e.g., incoming neuronal firing events) via the axons 15 of the core circuit 10. In one embodiment, each axon 15 has a corresponding axon type. In this specification, let $T_j$ generally denote an axon type of a $j^{th}$ axon 15 of the crossbar 12.

In one embodiment, there are four different axon types: Axon Type 0, Axon Type 1, Axon Type 2, and Axon Type 3. As shown in FIG. 2, the axons 15 of the core circuit 10 include a first axon group 15A, a second axon group 15B, a third axon group 15C, and a fourth axon group 15D. Each axon group 15A, 15B, 15C and 15D comprises at least one axon 15. The axon type of each axon 15 of the axon group 15A is Axon Type 0. The axon type of each axon 15 of the axon group 15B is Axon Type 1. The axon type of each axon 15 of the axon group 15C is Axon Type 2. The axon type of each axon 15 of the axon group 15D is Axon Type 3.

The synaptic strength (i.e., connection strength) between a neuron 11 and an axon 15 may be modulated. Each neuron 11 has a corresponding effective synaptic strength for each axon type Ty. In this specification, let $S_{i,Tj}$ generally denote an effective synaptic strength between an $i^{th}$ neuron 11 of the crossbar 12 and a $j^{th}$ axon 15 having an axon type $T_j$. Let $W_{ij}$ represent a synaptic weight of a synapse 31 between the $i^{th}$ neuron 11 and the $j^{th}$ axon 15. When the $i^{th}$ neuron 11 receives input (e.g., an incoming neuronal firing event) from the $j^{th}$ axon 15, a membrane potential variable V of the $i^{th}$ neuron 11 is adjusted based on the effective synaptic strength $S_{i,Tj}$ and the synaptic weight $W_{ij}$.

Figure 3:
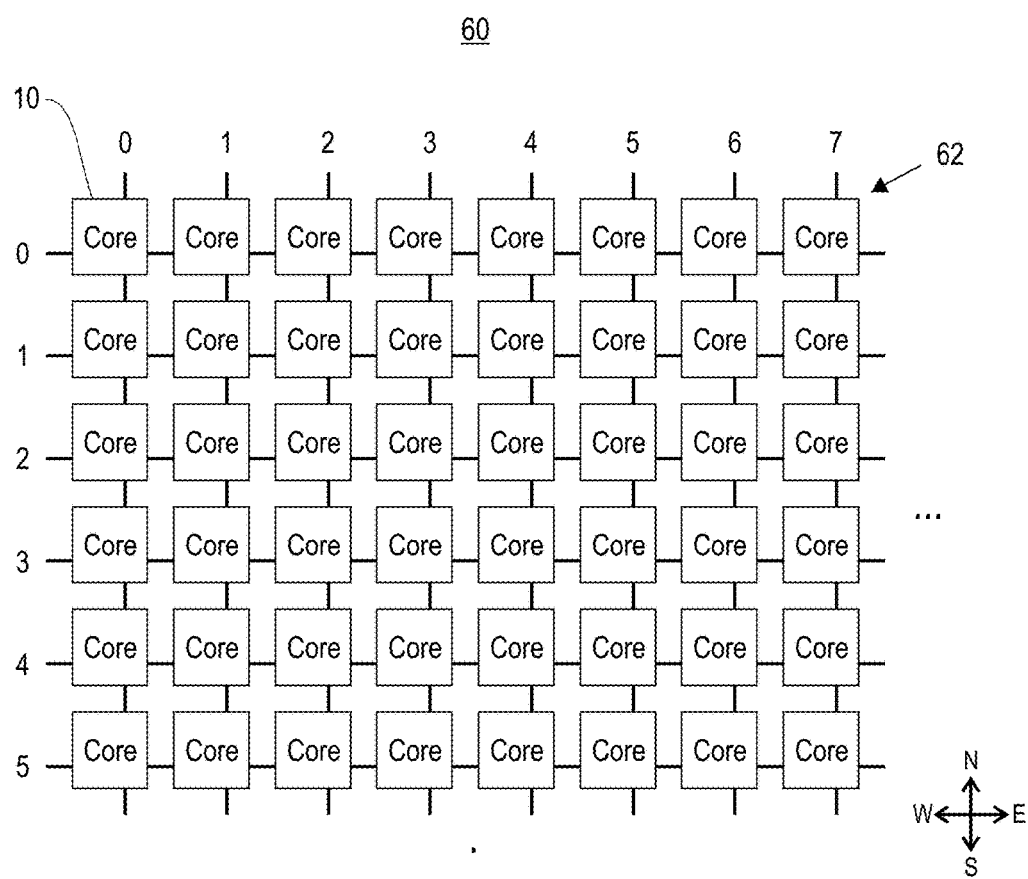
FIG. 3 illustrates an example neurosynaptic network circuit, in accordance with an embodiment of the invention.

FIG. 3 illustrates an example neurosynaptic network circuit 60, in accordance with an embodiment of the invention. The network circuit 60 is an example multi-core neurosynaptic system comprising multiple interconnected core circuits 10. In one embodiment, the core circuits 10 are arranged as a two-dimensional tile-able core array 62. Each core circuit 10 may be identified by its Cartesian coordinates as core (i, j), wherein i is a row index and j is a column index of the core array 62 (i.e., core (0,0), core (0,1), . . . , core (5,7)).

Each core circuit 10 utilizes a corresponding router 55 (FIG. 1) to pass along neuronal firing events in the eastbound, westbound, northbound, or southbound direction. For example, a neuron 11 (FIG. 1) of the core circuit (0,0) may generate a firing event targeting an incoming axon 15 (FIG. 1) of the core circuit (5,7). To reach the core circuit (5,7), the firing event may traverse seven core circuits 10 in the eastbound direction (i.e., from core (0,0) to cores (0,1), (0,2), (0,3), (0,4), (0,5), (0,6), and (0,7)), and five core circuits 10 in the southbound direction (i.e., from core (0,7) to cores (1, 7), (2, 7), (3, 7), (4, 7), and (5, 7)) via the routers 55 of the network circuit 60.

Feature extraction is essential to efficiently process, learn and associate high-dimensional data. One embodiment provides a neurosynaptic system for feature extraction, wherein the system comprises multiple core circuits 10. The system efficiently extracts features from sequences of images, videos or audio. The extracted features may then be used for scene understanding, object classification, pattern recognition, etc.

Figure 4:
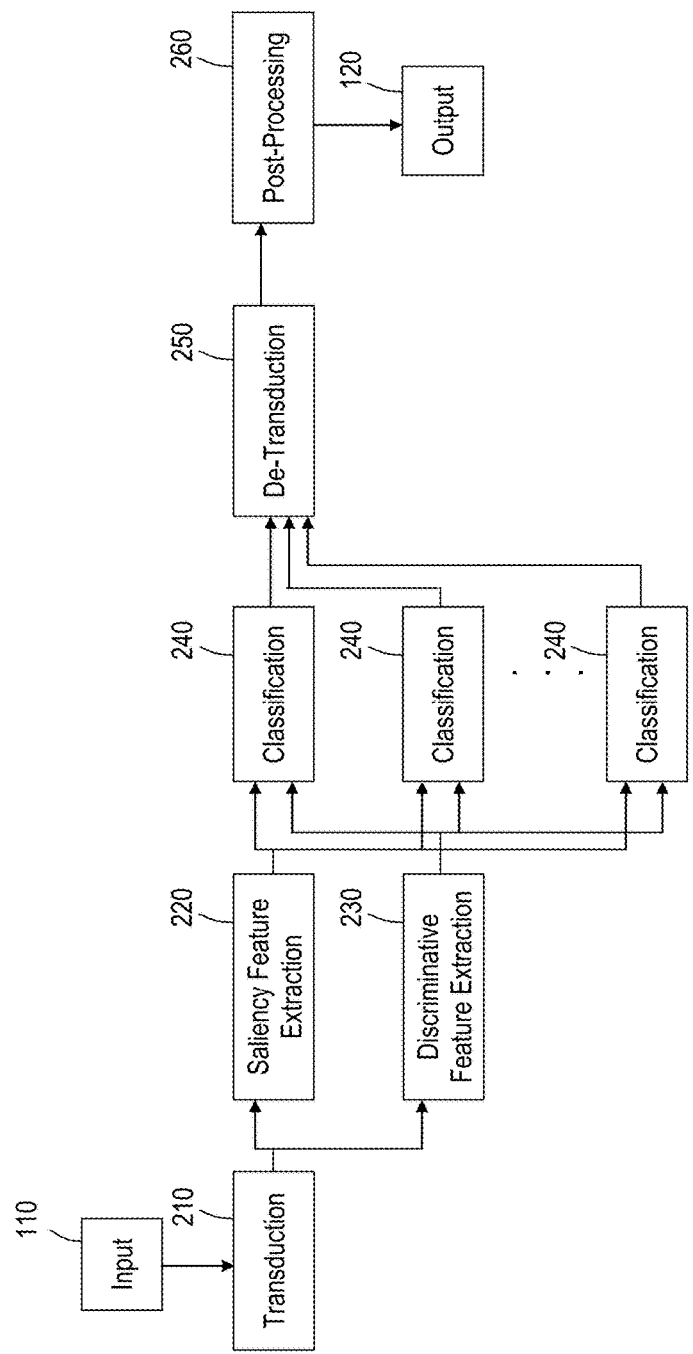
FIG. 4 illustrates an example neurosynaptic system for feature extraction, in accordance with an embodiment of the invention.

FIG. 4 illustrates an example neurosynaptic system 200 for feature extraction, in accordance with an embodiment of the invention. The system 200 receives input data from an external input system 110 (e.g., sensors, a moving camera, etc.). The input data received may comprise sequences of images, videos or audio.

In one embodiment, the input data received comprises input video. The input video comprises a sequence of image frames 150F (FIG. 6), wherein each image frame 150F represents a visual scene. Each image frame 150F comprises a two-dimensional array of pixels.

In this specification, let the term region of interest denote a portion of a visual scene where one or more objects of interest (e.g., a car, a person walking, etc.) are detected. The system 200 determines one or more regions of interest within each image frame 150F of an input video. The system 200 then classifies objects of interest within the regions of interest by assigning a classification label to each object of interest. Each classification label represents a predicated classification for the object of interest.

In one embodiment, the system 200 comprises a transduction unit 210. The transduction unit 210 pre-processes the input data received for feature extraction. In one embodiment, the transduction unit 210 converts each pixel of each image frame 150F to neural spikes (i.e., neuronal firing events). For each pixel, the number of neural spikes generated for the pixel is based on a corresponding pixel intensity value of the pixel.

The system 200 further comprises a saliency feature extraction module 220 for extracting one or more salient features from each image frame 150F. For each image frame 150F, the saliency feature extraction module 220 extracts salient features from the image frame 150F by processing neural spikes for each pixel of the image frame 150F. For each image frame 150F, the saliency feature extraction module 220 generates a corresponding map 410 (FIG. 5) representing salient features extracted from the image frame 150F as well as the regions of the image frame 150F that the salient features were extracted from. In one embodiment, the salient features extracted include motion saliency features and/or spatial saliency features. Motion saliency features are used to detect objects of interest in motion. Spatial saliency features are used to detect objects of interest that are not in motion.

The system 200 further comprises a discriminatory feature extraction module 220 for extracting one or more discriminative features from each image frame 150F. For each image frame 150F, the discriminatory feature extraction module 220 extracts discriminative features from the image frame 150F by processing neural spikes for each pixel of the image frame 150F. For each image frame 150F, the discriminatory feature extraction module 220 generates a corresponding map 420 (FIG. 5) representing the discriminative features extracted from the image frame 150F as well as the regions of the image frame 150F that the discriminative features were extracted from.

The system 200 further comprises one or more classification units 240. Each classification unit 240 operates as an object classifier.

Figure 7:
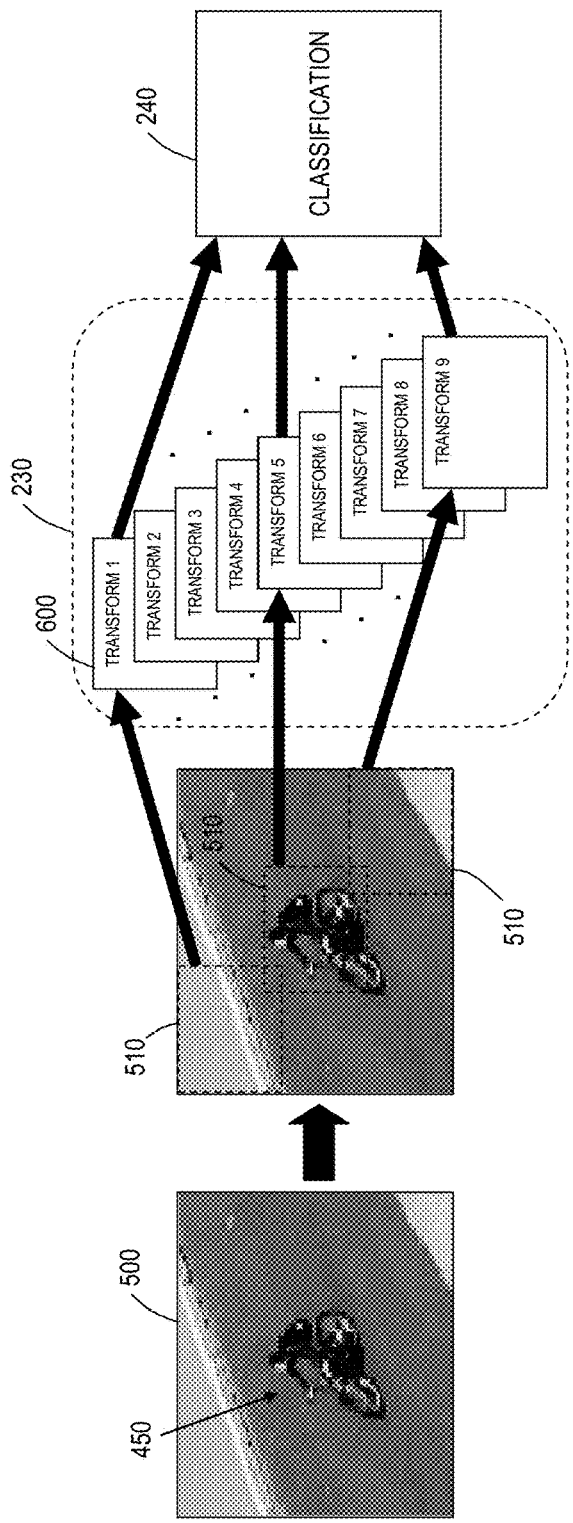
FIG. 7 illustrates an example discriminatory feature extraction module, in accordance with an embodiment of the invention.

In one embodiment, each image frame 150F may be divided into multiple image sub-frames 500 (FIG. 7). Each image sub-frame 500 of each image frame 150F has a corresponding index i indicating a location of the image sub-frame 500 within the image frame 150F, wherein i is a positive integer. Each image sub-frame 500 with index i has a corresponding classification unit 240 for assigning classification labels to features extracted from the image sub-frame 500. For each image sub-frame 500 of each image frame 150F, a corresponding classification unit 240 for the image sub-frame 500 assigns one or more classification labels, based on maps 410 and 420 corresponding to the image frame 150F, to any salient features and discriminative features extracted from the image sub-frame 500. The corresponding classification unit 240 only analyzes a portion 430 of the maps 410 and 420 that correspond to the image sub-frame 500. In one embodiment, the classification units 240 operate in parallel.

The system 200 further comprises a de-transduction unit 250 for converting neural spikes representing each pixel of each image frame 150F of the input video to pixels.

The system 200 further comprises a post-processing unit 260. For each image frame 150F, the post-processing unit 260 merges adjacent image sub-frames 500 of the image frame 150F to form a corresponding resulting image frame 150F (FIG. 5) that highlights/flags objects of interest detected within the image frame 150F. The resulting image frame 150F may be provided to an external output system 120 for display (e.g., an external monitor).

Each component of the system 200 (i.e., the transduction unit 210, the saliency feature extraction module 220, the discriminative feature extraction module 230, the classification units 240, the de-transduction unit 250, the post-processing unit 260) utilizes one or more core circuits 10 for implementing the functions/operations of the component.

In one embodiment, each core circuit 10 of a component of the system 200 operates as follows: each neuron 11 receives synaptic input comprising one or more neural spikes from one or more weighted synapses 31 connected to the neuron 11. The neural spikes received may be generated by other neurons 11 or may be from an external source. Each neural spike received is integrated into a membrane potential variable of the neuron 11 based on the weight of the synapse 31 that the neuron 11 received the neural spike from. Each neuron 11 produces outgoing neural spikes based on the integrated synaptic input and an activation function. In one embodiment, each neuron 11 generates an outgoing neural spike 130 when a membrane potential variable of the neuron 11 exceeds a pre-determined threshold.

In one embodiment, outgoing neural spikes generated by a particular set of neurons 11 within each feature extraction module 220, 230 are provided as output. The outgoing neural spikes generated by this set of neurons 11 encode salient/discriminative features extracted from an image frame 150F of the input video.

In one embodiment, the level of each feature extracted by each feature extraction module 220, 230 may be represented with outgoing neural spikes using a temporal coding scheme.

In one embodiment, outgoing neural spikes generated by a particular set of neurons 11 within each classification unit 240 are provided as output. The outgoing neural spikes generated by this set of neurons 11 encode class predictions for an image sub-frame 500 of an image frame 150F of the input video. In one embodiment, each classification unit 240 interprets features extracted from a corresponding image sub-frame 500 or classification labels assigned to the image sub-frame 500 into a human-readable format. For example, for each classification label, the sum of outgoing neural spikes generated for the classification label within a specified time window represents the number of votes for the classification label. The classification label with the most number of votes is interpreted as the predicted classification label.

In one embodiment, each classification unit 240 is trained using one of the following training techniques: stochastic gradient descent, a support vector machine, backpropagation, input/desired output covariance, and a restricted Boltzmann machine.

The features extracted by each feature extraction module 220, 230 may include mathematically defined features and/or learned features. In one embodiment, mathematically defined features are extracted using one or more of the following: edge extraction operators, texture extraction operators, and local averaging operators. In one embodiment, learned features are extracted using one or more of the following: a k-means clustering algorithm applied to training data, and an input/desired output covariance algorithm applied to training data.

Figure 5:
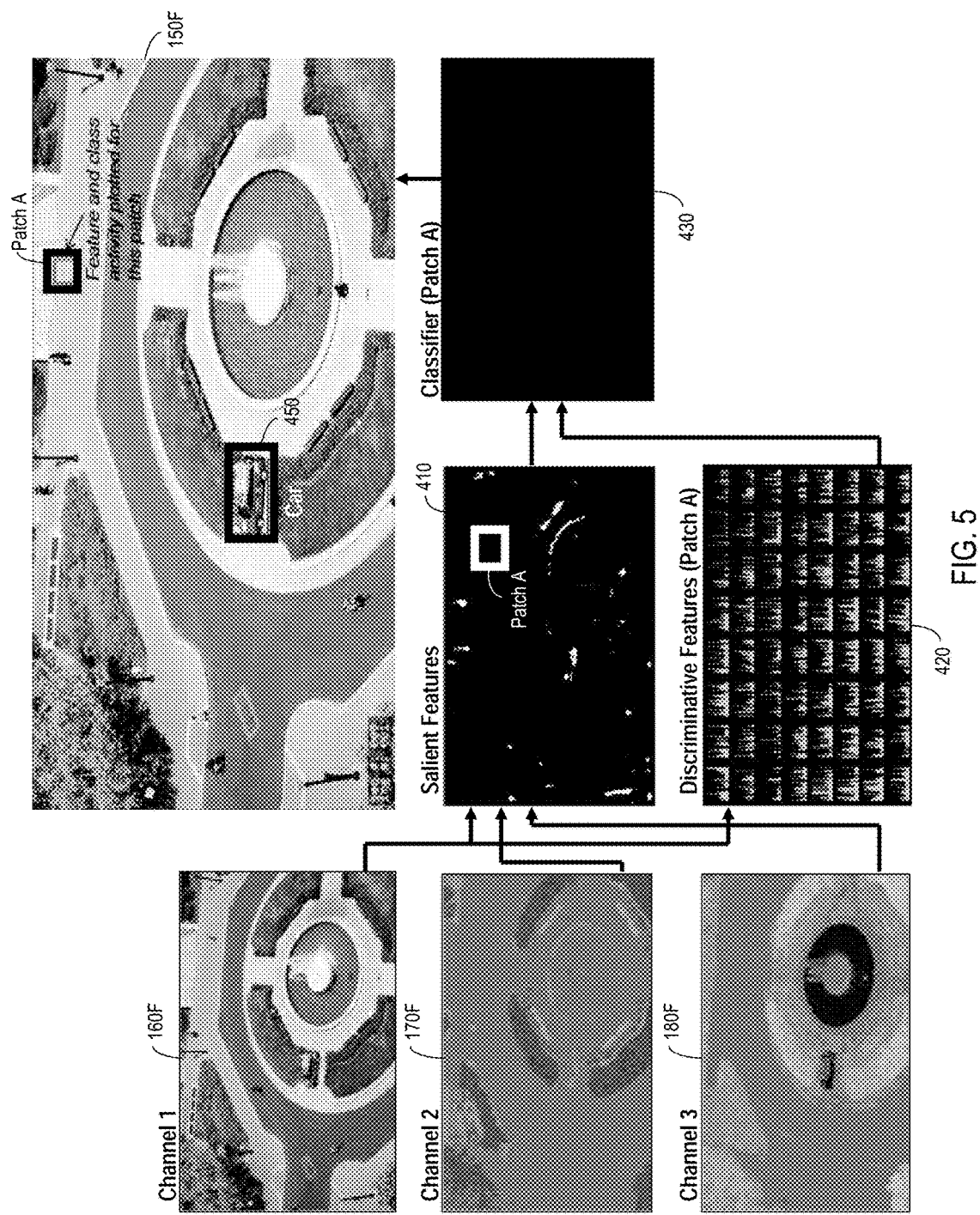
FIG. 5 illustrates performing scene understanding on an image frame, in accordance with an embodiment of the invention.

FIG. 5 illustrates performing scene understanding on an image frame 150F, in accordance with an embodiment of the invention. In one embodiment, the transduction unit 210 converts an input video received by the system 200 to a pre-determined color space. Specifically, the transduction unit 210 converts each image frame 150F to one or more channels, wherein each channel corresponds to a dimension of a color space.

For example, in one embodiment, an input video comprises a sequence of image frames 150F in the RGB color space. The transduction unit 210 converts each image frame 150F from the RGB color space to the L*a*b* color space. Specifically, the transduction unit 210 converts each image frame 150F to three separate channels: Channel 1 corresponding to the L* dimension of the L*a*b* color space, Channel 2 corresponding to the a* dimension of the L*a*b* color space, and Channel 3 corresponding to the b* dimension of the L*a*b* color space. In another embodiment, the transduction unit 210 converts each image frame 150F to fewer than, or more than, three separate channels.

The saliency feature extraction module 220 extracts salient features from each image frame 160F of Channel 1, each image frame 170F of Channel 2, and each image frame 180F of Channel 3. In one embodiment, the salient features extracted include motion saliency features and/or spatial saliency features. For each image frame 150F, the saliency feature extraction module 220 generates a corresponding map 410 representing the salient features extracted from corresponding image frames 160F, 170F and 180F.

Similarly, the discriminative feature extraction module 230 extracts salient features from each image frame 160F of Channel 1, each image frame 170F of Channel 2, and each image frame 180F of Channel 3. For each image frame 150F, the discriminative feature extraction module 230 generates a corresponding map 420 representing the discriminative features extracted from corresponding image frames 160F, 170F and 180F.

Each image sub-frame 500 of each image frame 150F has a corresponding classification unit 240 for assigning a classification label to salient features and/or discriminative features extracted from the image sub-frame 500.

For each image frame 150F, the post-processing unit 260 merges adjacent image sub-frames 500 of the image frame 150F to form a corresponding resulting image frame 150F that highlights objects of interest detected within the image frame 150F. For example, as shown in FIG. 5, a car within the image frame 150F is flagged as an object of interest.

Figure 6:
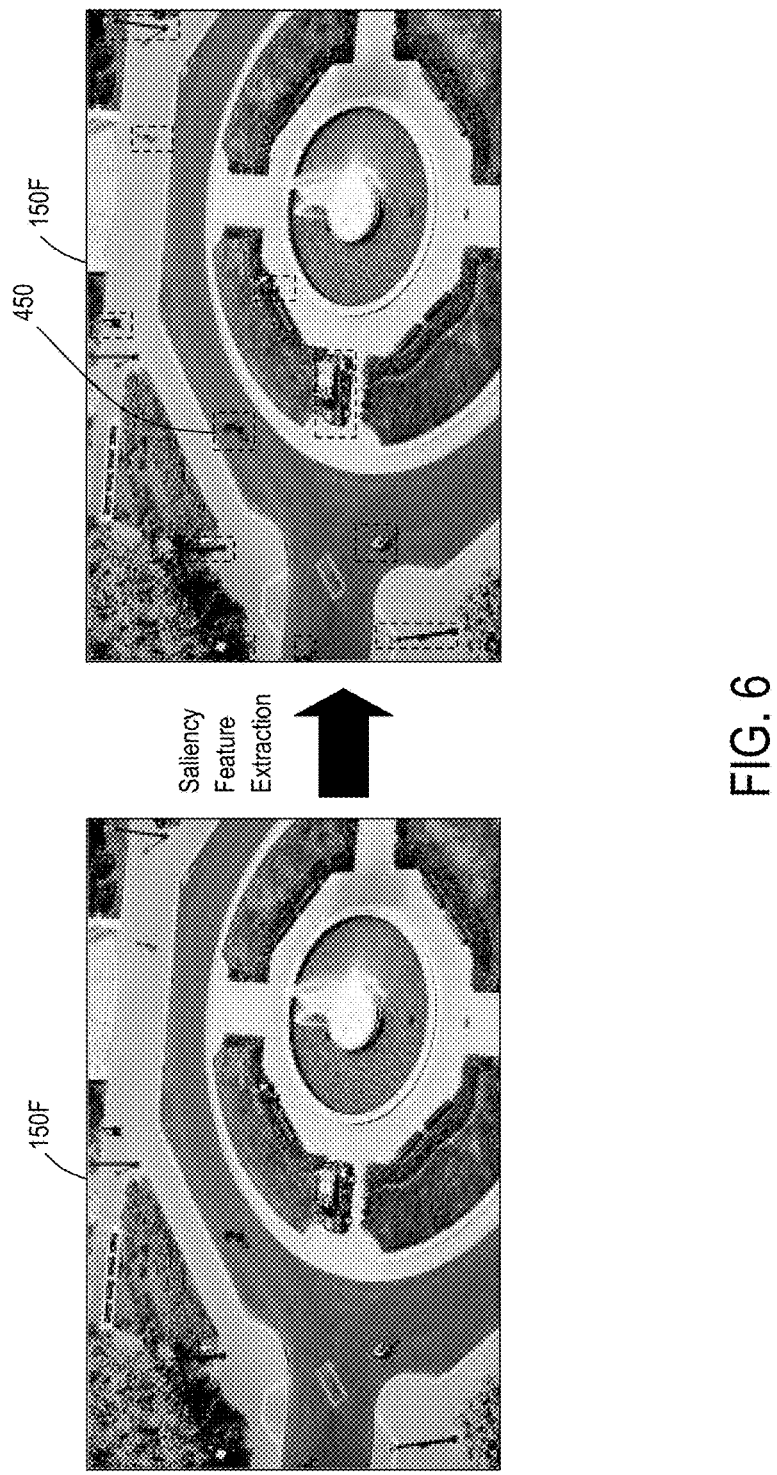
FIG. 6 illustrates an example image frame highlighting multiple regions of interest within a visual scene, in accordance with an embodiment of the invention.

FIG. 6 illustrates an example image frame 150F highlighting multiple regions 450 of interest within a visual scene, in accordance with an embodiment of the invention. The saliency feature extraction module 220 extracts salient features from an image frame 150F. Based on the salient features extracted, multiple regions 450 of interest are detected within the image frame 150F. As shown in FIG. 6, the regions 450 of interest include objects of interest in motion (e.g., a cyclist, a person walking) and objects of interest that are not in motion (e.g., a parked car, a lamp post).

FIG. 7 illustrates an example discriminatory feature extraction module 230, in accordance with an embodiment of the invention. The discriminative features extracted by the discriminatory feature extraction module 230 may include learned features. In FIG. 7, an image sub-frame 500 of an image frame 150F is provided to the discriminatory feature extraction module 230, wherein the image sub-frame 500 includes a detected region 450 of interest (e.g., a cyclist).

In one embodiment, the discriminatory feature extraction module 230 comprises multiple two-layered feature extractors 600. The image sub-frame 500 is divided into multiple input spaces 510 (e.g., image sub-patches). Each input space 510 has a corresponding feature extractor 600. As described in detail later herein, each feature extractor 600 comprises a first layer 610 of core circuits 10 and one or more subsequent layers 620 of core circuits 10. Synaptic connectivity information (e.g., synaptic weights and effective synaptic strengths) for each feature extractor 600 is set based on a corresponding transform.

Figure 8:
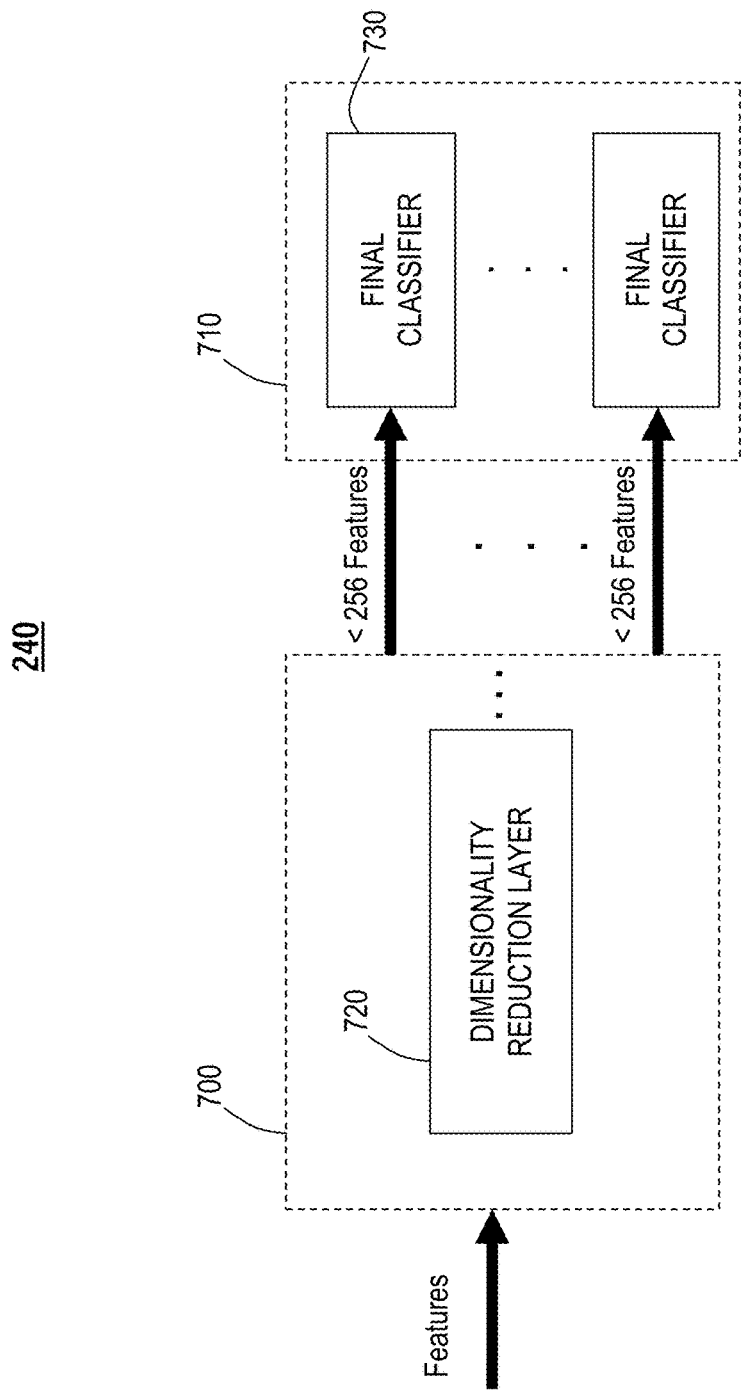
FIG. 8 illustrates an example classification unit for a corresponding patch, in accordance with an embodiment of the invention.

For example, in one embodiment, the size dimension of the image sub-frame 500 is 96×96. The image sub-frame 500 is divided into a total of nine input spaces 510, wherein the size dimension of each input space 510 is 32×32. The total number of feature extractors 600 required for the entire image sub-frame 500 is nine. Each feature extractor has a corresponding transform (e.g., TRANSFORM 1 for a feature extractor corresponding to the first input space 510, TRANSFORM 2 for a feature extractor corresponding to the second input space 510, . . . , and TRANSFORM 9 for a feature extractor corresponding to the ninth input space 510). FIG. 8 illustrates an example classification unit 240 for a corresponding image sub-frame 500, in accordance with an embodiment of the invention. Based on features extracted from the corresponding image sub-frame 500, the classification unit 240 classifies an object of interest, if any, within the corresponding image sub-frame 500 by assigning a class decision (i.e., class label, classification). The following are example class decisions: "Car", "Truck", "Bus", "Person", "Cyclist", "null". For example, the object of interest illustrated in the image sub-frame 500 shown in FIG. 7 may be assigned with the class decision "Cyclist". As another example, the class decision "null" is assigned when there is no object of interest in the corresponding image sub-frame 500.

In one embodiment, the classification unit 240 operates in two stages: a dimensionality reduction stage 700 and a final classification stage 710. The dimensionality reduction stage 700 utilizes one or more dimensionality reduction layers 720 for providing a reduced number of features extracted from the corresponding input space 510. Specifically, each dimensionality reduction layer 720 comprises a layer of multiple core circuits 10 for applying dimensionality reduction to the features extracted from the corresponding image sub-frame 500. In one embodiment, the total number of features extracted from the corresponding image sub-frame 500 (e.g., thousands of features extracted from the corresponding image sub-frame 500) is reduced to less than 256.

The final classification stage 710 comprises a layer of final classifiers 730 for assigning, based on the reduced number of features extracted from the corresponding image sub-frame 500, a final class decision to an object of interest, if any, within the corresponding image sub-frame 500. Each final classifier 730 comprises a core circuit 10 for receiving the reduced number of features extracted from the corresponding input space 510. In one embodiment, each final classifier 730 receives less than 256 features.

Each neuron 11 of the classification unit 240 corresponds to a possible class decision. In one embodiment, each possible class decision utilizes at most 8 neurons 11.

In another embodiment, the classification unit 240 bypasses the dimensionality reduction stage 700 and comprises only the final classification stage 710.

Each core circuit 10 of the classification unit 240 has learned synaptic weights. In one embodiment, a linear classifier is trained to produce a discriminant weight matrix K with multiple dimensions, each dimension having multiple elements. The linear classifier is trained based on features extracted from a corresponding input space 510. For example, let N denote the total number of features extracted from the corresponding input space 510, and let M denote the total number of available classification labels/classes to classify objects of interest as. The weight matrix K produced by the linear classifier is an N×M matrix having a first dimension and a second dimension, wherein each element of the first dimension represents a row of the matrix K, and each element of the second dimension represents a column of the matrix K. Elements of the first dimension correspond to the features extracted, and elements of the second dimension correspond to the available classification labels. Specifically, each row of the matrix K corresponds to a particular feature of the features extracted, and each column of the matrix K corresponds to a particular classification label of the available classification labels.

The elements of the second dimension are arranged based on one or more synaptic weight arrangements, wherein each synaptic weight arrangement represents effective synaptic strengths for a particular classification label of the available classification labels. Specifically, each column of the matrix K is arranged into a corresponding synaptic weight arrangement representing effective synaptic strengths for a classification label corresponding to the column.

A core circuit 10 is configured to classify one or more objects of interest in the input data by programming the core circuit 10 with synaptic connectivity information based on the synaptic weight arrangements. Specifically, synaptic weights for synapse devices of the core circuit 10 are set/programmed based on each synaptic weight arrangement corresponding to each column of the matrix K.

In one embodiment, each column of the matrix K is arranged into a corresponding synaptic weight arrangement representing effective synaptic strengths for a classification label corresponding to the column by dividing the column into multiple columns based on a Latin square. In one embodiment, the first matrix is mapped to the synaptic array of a core circuit 10 to reduce spiking of the neurons of the core circuit 10.

Figure 9:
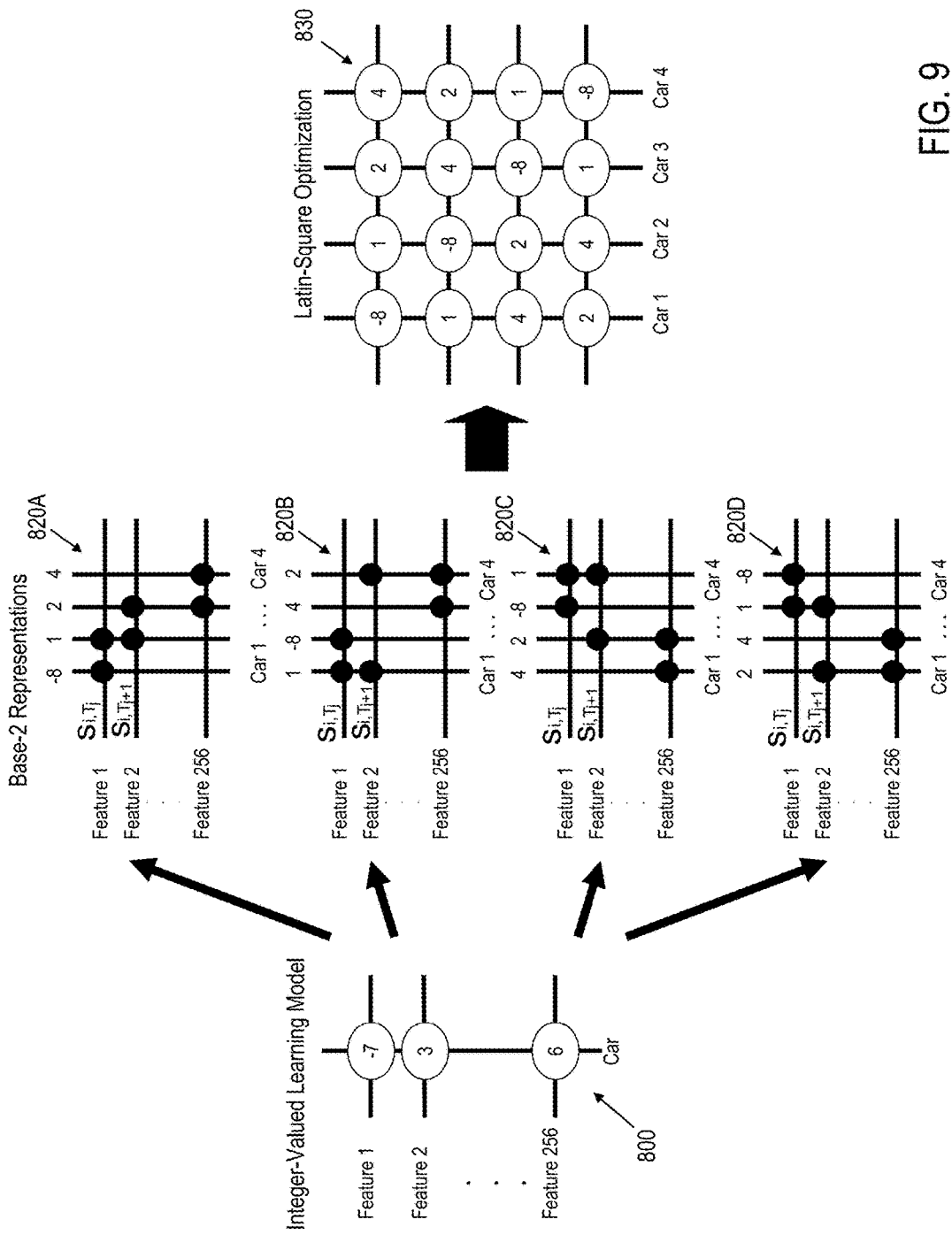
FIG. 9 illustrates an example synaptic weight arrangement for dimensionality reduction, in accordance with an embodiment of the invention.

FIG. 9 illustrates an example synaptic weight arrangement 830 for dimensionality reduction, in accordance with an embodiment of the invention. In one embodiment, synaptic weights of each core circuit 10 of each dimensionality reduction layer 720 is learned based on an integer-valued learning model 800. Synaptic weights representing each possible feature is quantized to an integer value.

In one embodiment, synaptic weights representing each possible feature is quantized to an integer value between −8 and +7. For example, as shown in FIG. 9, synaptic weights representing a first possible feature ("Feature 1"), a second possible feature ("Feature 2"), . . . , and a third possible feature ("Feature 256") for the possible class decision "Car" are quantized as integer values −7, 3 and 6, respectively.

A crossbar 12 of a core circuit 10 of a dimensionality reduction layer 720 may be set using one or more base-2 representations for synaptic weights. FIG. 9 shows different example base-2 representations for synaptic weights. For example, in a first example base-2 representation 820A, a first column, a second column, a third column and a fourth column of a crossbar 12 may correspond to integer values −8, 1, 2 and 4, respectively. Both the first column corresponding to the integer value −8 and the second column corresponding to the integer value 1 are used to represent the integer value −7 for Feature 1 (i.e., the sum of −8 and 1 is −7). Each synapse 31 at the first column and the second column that interconnects an axon 15 assigned to Feature 1 with a neuron 11 assigned to the possible class decision "Car" is set (i.e., turned on). Both the second column corresponding to the integer value 1 and the third column corresponding to the integer value 2 are used to represent the integer value 3 for Feature 2 (i.e., the sum of 1 and 2 is 3). Each synapse 31 at the second column and the third column that interconnects an axon 15 assigned to Feature 2 with a neuron 11 assigned to the possible class decision "Car" is set (i.e., turned on). Both the third column corresponding to the integer value 2 and the fourth column corresponding to the integer value 4 are used to represent the integer value 6 for Feature 256 (i.e., the sum of 2 and 4 is 6). Each synapse 31 at the third column and the fourth column that interconnects an axon 15 assigned to Feature 256 with a neuron 11 assigned to the possible class decision "Car" is set (i.e., turned on).

In a second example base-2 representation 820B, a first column, a second column, a third column and a fourth column of a crossbar 12 may correspond to integer values 1, −8, 4 and 2, respectively. In a third example base-2 representation 820C, a first column, a second column, a third column and a fourth column of a crossbar 12 may correspond to integer values 4, 2, −8 and 1, respectively. In a fourth example base-2 representation 820D, a first column, a second column, a third column and a fourth column of a crossbar 12 may correspond to integer values 2, 4, 1 and −8, respectively.

In one embodiment, effective synaptic strengths for neurons 11 for each possible axon type is represented by a corresponding base-2 representation. For example, effective synaptic strengths for neurons 11 assigned to the possible class decision "Car" for the axon types Axon Type 0, Axon Type 1, Axon Type 2 and Axon Type 3 may be represented by the base-2 representations 820A, 820B, 820C and 820D, respectively.

The example synaptic weight arrangement 830 in FIG. 9 is an example 4×4 Latin-square optimization that incorporates all four base-2 representations 820A, 820B, 820C and 820D. In one embodiment, the synaptic weight arrangement 830 represents effective synaptic strengths for neurons 11 assigned to the possible class decision "Car" for all four possible axon types. Therefore, a core circuit 10 of a dimensionality reduction layer 720 that is set based on the synaptic weight arrangement 830 uses all four possible axon types. In one embodiment, the synaptic weight arrangement 830 and a negative of the synaptic weight arrangement 830 are concatenated to implement neurons 11 that fire for both positive and neural spikes.

In one embodiment, synaptic weights of each core circuit 10 of each final classifier 730 is learned based on an integer-valued learning model wherein synaptic weights representing each possible feature is quantized to an integer value between −2 and +2. The four possible axon types are used to set four different effective synaptic strengths. As the dimensionality reduction stage 700 reduces the total number of features extracted from the corresponding image subframe 500, the reduced number of features may all fit onto each core circuit 10 of the final classification stage 710.

Figure 10:
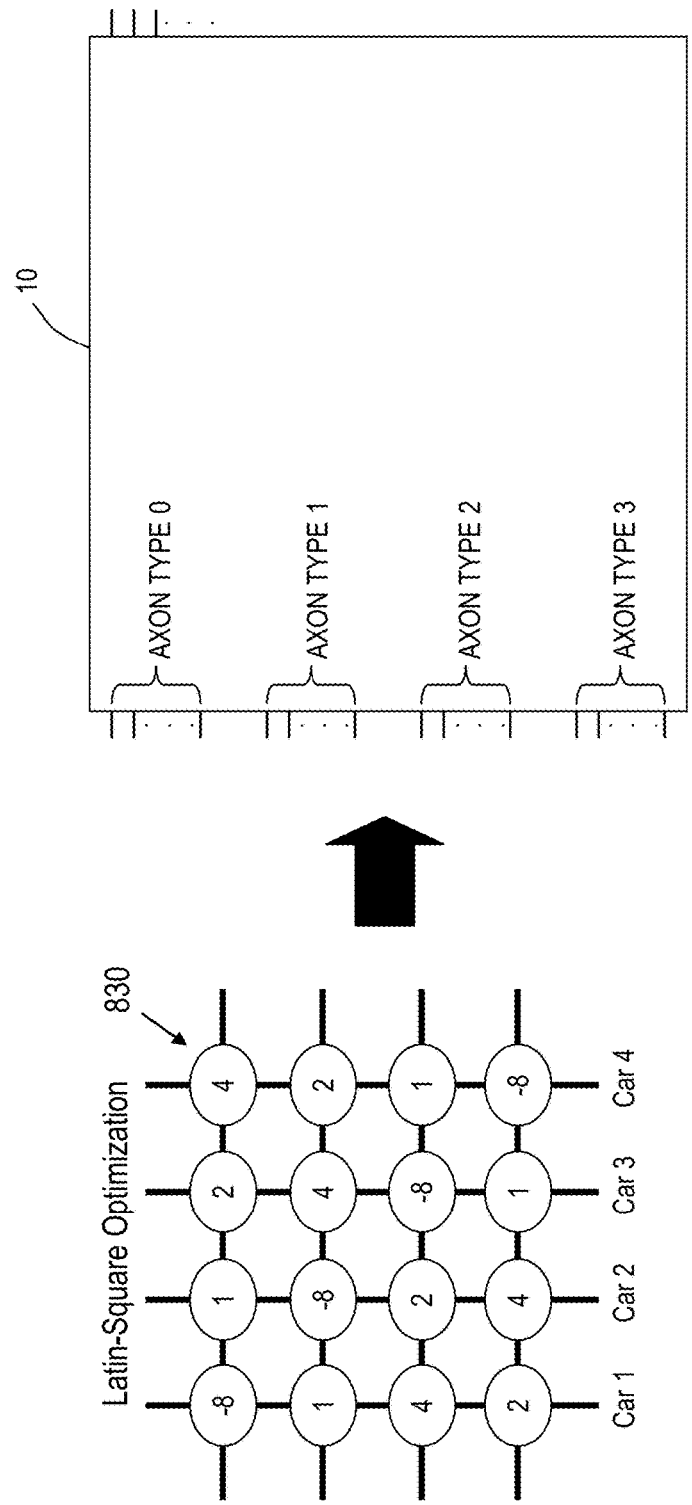
FIG. 10 illustrates applying the example synaptic weight arrangement in FIG. 9 to a core circuit, in accordance with an embodiment of the invention.

FIG. 10 illustrates applying the example synaptic weight arrangement 830 in FIG. 9 to a core circuit, in accordance with an embodiment of the invention. As stated above, each axon 15 has a corresponding axon type. In one embodiment, each core circuit 10 of each dimensionality reduction layer 720 may include a first set of axons 15 with axon type Axon Type 0, a second set of axons 15 with axon type Axon Type 1, a third set of axons 15 with axon type Axon Type 2, and a fourth set of axons 15 with axon type Axon Type 3. For the first set of axons 15 with axon type Axon Type 0, synapses 31 interconnecting the first set of axons 15 and neurons 11 assigned to the possible class decision "Car" are set based on the first base-2 representation 820A. For the second set of axons 15 with axon type Axon Type 1, synapses 31 interconnecting the second set of axons 15 and neurons 11 assigned to the possible class decision "Car" are set based on the second base-2 representation 820B. For the third set of axons 15 with axon type Axon Type 2, synapses 31 interconnecting the third set of axons 15 and neurons 11 assigned to the possible class decision "Car" are set based on the third base-2 representation 820C. For the fourth set of axons 15 with axon type Axon Type 3, synapses 31 interconnecting the fourth set of axons 15 and neurons 11 assigned to the possible class decision "Car" are set based on the fourth base-2 representation 820D.

Figure 11:
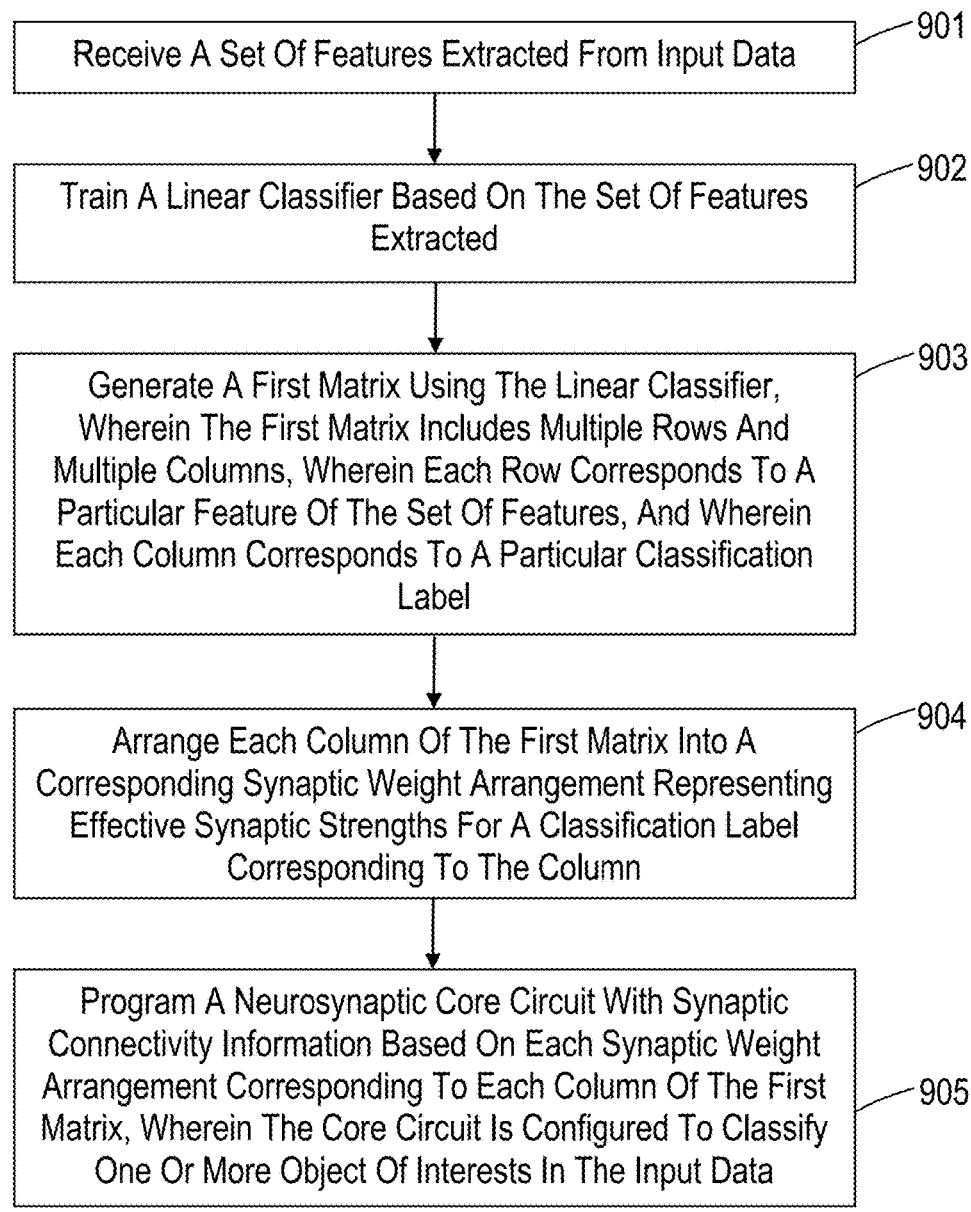
FIG. 11 illustrates a flowchart of an example process for feature extraction, in accordance with an embodiment of the invention.

FIG. 11 illustrates a flowchart of an example process 900 for feature extraction, in accordance with an embodiment of the invention. In process block 901, receive a set of features extracted from input data. In process block 902, train a linear classifier based on the set of features extracted. In process block 903, generate a first matrix using the linear classifier, wherein the first matrix includes multiple rows and multiple columns, wherein each row corresponds to a particular feature of the set of features, and wherein each column corresponds to a particular classification label. In process block 904, arrange each column of the first matrix into a corresponding synaptic weight arrangement representing effective synaptic strengths for a classification label corresponding to the column. In process block 905, program a neurosynaptic core circuit with synaptic connectivity information based on each synaptic weight arrangement corresponding to each column of the first matrix, wherein the core circuit is configured to classify one or more object of interests in the input data.

Figure 12:
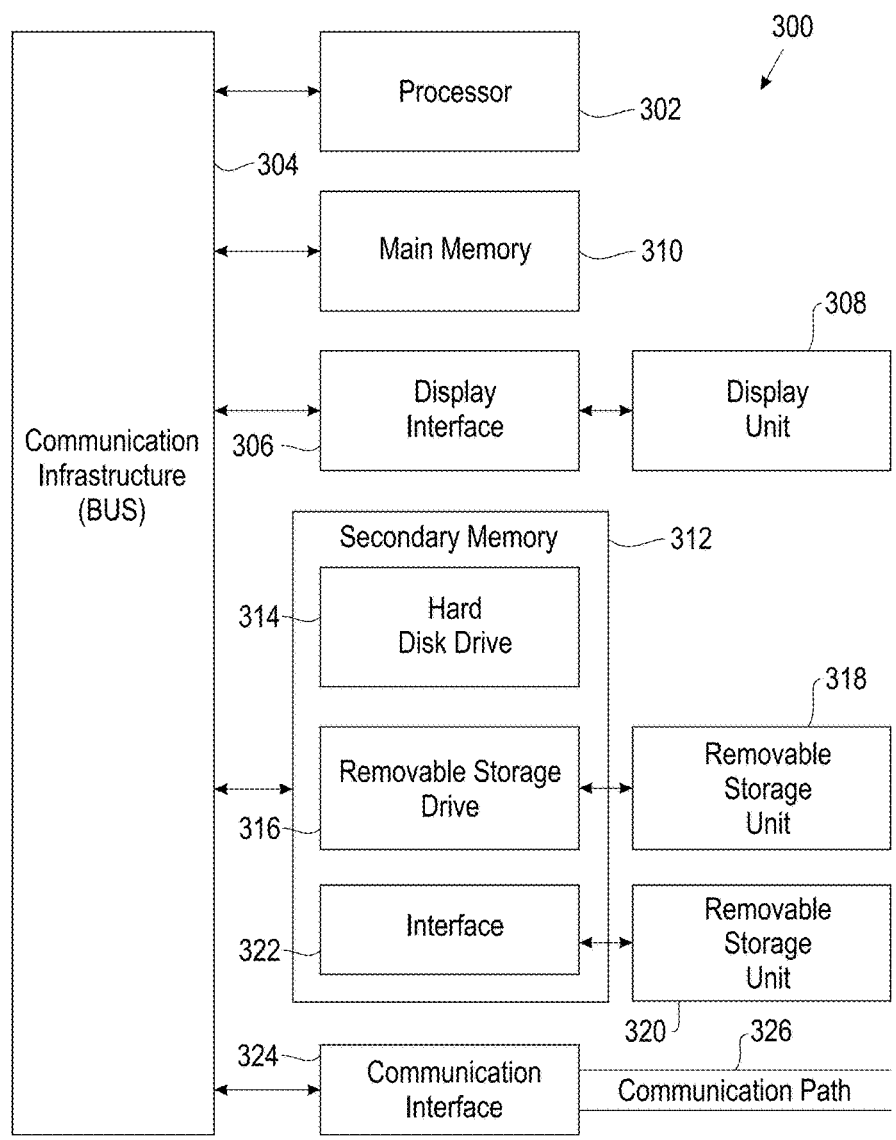
FIG. 12 is a high level block diagram showing an information processing system useful for implementing one embodiment of the present invention.

FIG. 12 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for classifying features using a neurosynaptic system. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving a set of features extracted from input data;
training a linear classifier based on the set of features extracted;
generating a first matrix using the linear classifier, wherein the first matrix includes a first dimension and a second dimension, wherein each dimension includes multiple elements, wherein each element of the first dimension corresponds to a feature of the set of features extracted, and wherein each element of the second dimension corresponds to a classification label of a set of different classification labels for classifying one or more objects of interest in the input data;
arranging each element of the second dimension into a corresponding synaptic weight arrangement representing effective synaptic strengths for a classification label corresponding to the element;
programming a first neurosynaptic core circuit for dimensionality reduction by programming synaptic weights of a plurality of electronic synapse devices of the first neurosynaptic core circuit based on each synaptic weight arrangement that each element of the second dimension is arranged into; and
reducing a number of features included in the first set of features utilizing the first neurosynaptic core circuit, wherein the reduced number of features are mapped to a second neurosynaptic core circuit configured to classify the one or more objects of interest in the input data;
wherein each synaptic weight of the synaptic weight arrangement represents a feature associated with a classification label and quantized to a particular value of a range of values to facilitate the dimensionality reduction and the mapping of the reduced number of features to the second neurosynaptic core circuit such that the reduced number of features all fit onto the second neurosynaptic core circuit.

2. The method of claim 1, wherein each neurosynaptic core circuit comprises one or more electronic neurons, one or more electronic axons, and a synaptic array including a plurality of electronic synapse devices for interconnecting the neurons with the axons.

3. The method of claim 2, wherein each synaptic weight arrangement that each element of the second dimension is arranged into comprises a weight matrix including multiple integer values representing effective synaptic strengths for a classification label corresponding to the element.

4. The method of claim 3, wherein:
each axon has a corresponding axon type; and
the effective synaptic strengths include different effective synaptic strengths for different axon types.

5. The method of claim 2, wherein:
each element of the first dimension represents a row of the first matrix;
each element of the second dimension represents a column of the first matrix; and
the arranging further comprises:
dividing at least one column of the first matrix into multiple columns.

6. The method of claim 5, wherein each column of the first matrix is divided into multiple columns based on a Latin square.

7. The method of claim 6, further comprising:
mapping the first matrix to a synaptic array of the first neurosynaptic core circuit to reduce spiking of the neurons of the core circuit.

8. The method of claim 1, wherein the input data comprises one of an image sequence, an audio sequence, and a video sequence.

9. A system comprising:
at least one processor; and
a non-transitory processor-readable memory device storing instructions that when executed by the at least one processor causes the at least one processor to perform instructions including:
receiving a set of features extracted from input data;
training a linear classifier based on the set of features extracted;
generating a first matrix using the linear classifier, wherein the first matrix includes a first dimension and a second dimension, wherein each dimension includes multiple elements, wherein each element of the first dimension corresponds to a feature of the set of features extracted, and wherein each element of the second dimension corresponds to a classification label of a set of different classification labels for classifying one or more objects of interest in the input data;
arranging each element of the second dimension into a corresponding synaptic weight arrangement representing effective synaptic strengths for a classification label corresponding to the element;
programming a first neurosynaptic core circuit for dimensionality reduction by programming synaptic weights of a plurality of electronic synapse devices of the first neurosynaptic core circuit based on each synaptic weight arrangement that each element of the second dimension is arranged into; and
reducing a number of features included in the first set of features utilizing the first neurosynaptic core circuit, wherein the reduced number of features are mapped to a second neurosynaptic core circuit configured to classify the one or more objects of interest in the input data;
wherein each synaptic weight of the synaptic weight arrangement represents a feature associated with a classification label and quantized to a particular value of a range of values to facilitate the dimensionality reduction and the mapping of the reduced number of features to the second neurosynaptic core circuit such that the reduced number of features all fit onto the second neurosynaptic core circuit.

10. The system of claim 9, wherein each neurosynaptic core circuit comprises one or more electronic neurons, one or more electronic axons, and a synaptic array including a plurality of electronic synapse devices for interconnecting the neurons with the axons.

11. The system of claim 10, wherein each synaptic weight arrangement that each element of the second dimension is arranged into comprises a weight matrix including multiple integer values representing effective synaptic strengths for a classification label corresponding to the element.

12. The system of claim 11, wherein:
each axon has a corresponding axon type; and
the effective synaptic strengths include different effective synaptic strengths for different axon types.

13. The system of claim 10, wherein:
each element of the first dimension represents a row of the first matrix;
each element of the second dimension represents a column of the first matrix; and
the arranging further comprises:
dividing at least one column of the first matrix into multiple columns.

14. The system of claim 13, wherein a column of the first matrix is divided into multiple columns based on a Latin square.

15. The system of claim 14, wherein the first matrix is mapped to a synaptic array of the first neurosynaptic core circuit to reduce spiking of the neurons of the core circuit.

16. The system of claim 9, wherein the input data comprises one of an image sequence, an audio sequence, and a video sequence.

17. A non-transitory computer-readable medium storing instructions that, when executed by at least one processor of a machine, cause the machine to perform operations comprising:
receiving a set of features extracted from input data;
training a linear classifier based on the set of features extracted;
generating a first matrix using the linear classifier, wherein the first matrix includes a first dimension and a second dimension, wherein each dimension includes multiple elements, wherein each element of the first dimension corresponds to a feature of the set of features extracted, and wherein each element of the second dimension corresponds to a classification label of a set of different classification labels for classifying one or more objects of interest in the input data;
arranging each element of the second dimension into a corresponding synaptic weight arrangement representing effective synaptic strengths for a classification label corresponding to the element;
programming a first neurosynaptic core circuit for dimensionality reduction by programming synaptic weights of a plurality of electronic synapse devices of the first neurosynaptic core circuit based on each synaptic weight arrangement that each element of the second dimension is arranged into; and
reducing a number of features included in the first set of features utilizing the first neurosynaptic core circuit, wherein the reduced number of features are mapped to a second neurosynaptic core circuit configured to classify the one or more objects of interest in the input data;
wherein each synaptic weight of the synaptic weight arrangement represents a feature associated with a classification label and quantized to a particular value of a range of values to facilitate the dimensionality reduction and the mapping of the reduced number of features to the second neurosynaptic core circuit such that the reduced number of features all fit onto the second neurosynaptic core circuit.

\* \* \* \* \*